(12) United States Patent
Hsu

(10) Patent No.: US 12,523,356 B2
(45) Date of Patent: Jan. 13, 2026

(54) LAMP CIRCUIT AND GROUND-INSERT LAMP

(71) Applicant: DONGGUAN JIASHENG LIGHTING TECHNOLOGY COMPANY LTD, Dongguan (CN)

(72) Inventor: Chih-Pin Hsu, Dongguan (CN)

(73) Assignee: DONGGUAN JIASHENG LIGHTING TECHNOLOGY COMPANY LTD, Dongguan (CN)

( * ) Notice: Subject to any disclaimer, the term of this patent is extended or adjusted under 35 U.S.C. 154(b) by 0 days.

(21) Appl. No.: 18/811,815

(22) Filed: Aug. 22, 2024

(65) Prior Publication Data

US 2025/0264207 A1 Aug. 21, 2025

(30) Foreign Application Priority Data

Feb. 19, 2024 (CN) .......................... 202420310119.8
Feb. 19, 2024 (CN) .......................... 202420310145.0

(51) Int. Cl.
*F21V 14/02* (2006.01)
*F21V 21/08* (2006.01)
*F21V 31/00* (2006.01)

(52) U.S. Cl.
CPC .......... *F21V 14/02* (2013.01); *F21V 21/0824* (2013.01); *F21V 31/005* (2013.01)

(58) Field of Classification Search
CPC ..... F21V 14/02; F21V 21/0824; F21V 31/005
See application file for complete search history.

(56) References Cited

U.S. PATENT DOCUMENTS

| 10,823,377 | B1* | 11/2020 | Hsu | F21V 19/02 |
| 11,209,150 | B1* | 12/2021 | Lu | F21K 9/275 |
| 2005/0135101 | A1* | 6/2005 | Richmond | F21S 9/035 362/276 |
| 2006/0198153 | A1* | 9/2006 | Chien | F21V 23/0442 362/382 |
| 2010/0265715 | A1* | 10/2010 | Winstanley | F21S 2/00 362/277 |
| 2012/0134135 | A1* | 5/2012 | Richmond | B65D 85/42 362/85 |

(Continued)

FOREIGN PATENT DOCUMENTS

| CN | 210688078 U | 6/2020 |
| CN | 217656769 U | 10/2022 |

*Primary Examiner* — Tsion Tumebo
(74) *Attorney, Agent, or Firm* — Andrew C. Cheng

(57) ABSTRACT

A lamp circuit and a ground-insert lamp are provided, the lamp circuit includes a gear switch module, a control module, a drive module and a light source assembly that are electrically connected. The gear switch module includes at least two switches. The drive module is provided with a power supply end, an input end and an output end, respectively connected to a power supply, the control module, and the input end of the light source assembly. The control module is configured to generate different control signals based on the on-off states of the at least two switches, and the drive module is configured to adjust the luminous flux of the light source assembly based on different control signals. The lamp circuit is configured to adjust the luminous flux to provide a more intelligent, sophisticated, and convenient experience, better meeting the user's needs for controlling the luminous flux.

18 Claims, 13 Drawing Sheets

(56) References Cited

U.S. PATENT DOCUMENTS

| | | | |
|---|---|---|---|
| 2014/0300274 A1* | 10/2014 | Acatrinei | H05B 45/3578 315/122 |
| 2019/0110343 A1* | 4/2019 | Van Kaathoven | H05B 45/3725 |
| 2019/0338895 A1* | 11/2019 | Jeswani | F21V 23/04 |
| 2023/0371147 A1* | 11/2023 | Hsu | H05B 45/327 |

* cited by examiner

LAMP CIRCUIT AND GROUND-INSERT LAMP

TECHNICAL FIELD

The present disclosure relates to the technical field of lighting, and in particular to a lamp circuit and a ground-insert lamp.

BACKGROUND

Luminous flux, a key lighting parameter regulated by lamp circuits, is essential for meeting diverse lighting requirements in the dynamic and intricate modern lighting landscape. As lighting technology progresses, users increasingly demand more sophisticated and intelligent control over luminous flux adjustment. Consequently, achieving precise and intelligent luminous flux adjustment within lamp circuits has emerged as a novel technical challenge.

SUMMARY

In order to solve the problem that the existing lamp circuit is difficult to meet the intelligent and refined requirements of luminous flux regulation, the present disclosure provides a lamp circuit and a ground-insert lamp.

To address the technical problems above, one embodiment of the present disclosure provides a lamp circuit, which includes a gear switch module, a control module, a drive module and a light source assembly that are electrically connected. The gear switch module includes at least two switches. The drive module is provided with a power supply end, an input end and an output end. The power supply end of the drive module is connected to a power supply, the input end of the drive module is connected to the output end of the control module, and the output end of the drive module is connected to the input end of the light source assembly. The control module is configured to generate different control signals based on the on-off states of the at least two switches, and the drive module is configured to adjust the luminous flux of the light source assembly based on different control signals.

To address the technical problems above, another embodiment of the present disclosure provides a ground-insert lamp. The ground-insert lamp includes a lamp body. The lamp body includes a protective cover and a lamp circuit arranged in the protective cover. The lamp circuit includes a gear switch module, a control module, a drive module and a light source assembly that are electrically connected. The gear switch module includes at least two switches, and the drive module is provided with a power supply end, an input end and an output end. The power supply end of the drive module is connected to the power supply, the input end of the drive module is connected to the output end of the control module, and the output end of the drive module is connected to the input end of the light source assembly. The control module generates different control signals based on the on-off states of the at least two switches, and the drive module adjusts the luminous flux of the light source assembly based on different control signals.

In comparison to prior art, the lamp circuit and ground-insert lamp of the present disclosure offer several advantageous features.

An embodiment of the present disclosure provides a lamp circuit, which includes a gear switch module, a control module, a drive module and a light source assembly that are electrically connected. The gear switch module includes at least two switches. The drive module is provided with a power supply end, an input end and an output end. The power supply end of the drive module is connected to a power supply, the input end of the drive module is connected to the output end of the control module, and the output end of the drive module is connected to the input end of the light source assembly. The control module is configured to generate different control signals based on the on-off states of the at least two switches, and the drive module is configured to adjust the luminous flux of the light source assembly based on different control signals. By connecting the input end of the drive module to the output end of the control module, the control module generates PWM signals with different duty cycles as control signals based on the on-off states of the at least two switches. The drive module adjusts the luminous flux of the light source assembly according to different control signals generated by the control module, effectively linking the specific on-off states of the at least two switches of the gear switch module with the luminous flux. The control module generates control signals based on the on-off states, thereby improving the intelligence of the lamp circuit. The specific on-off states of the at least two switches form different combinations corresponding to different control signals of the control module, allowing for more accurate luminous flux control and enhancing the overall intelligence, precision, and convenience of the lamp circuit in adjusting luminous flux levels to meet specific demands.

BRIEF DESCRIPTION OF DRAWINGS

In order to more clearly illustrate the technical solutions of the embodiments of the present disclosure, the drawings needed to be used in the description of the embodiments will be briefly introduced below. Obviously, the drawings in the following description are some embodiments of the present disclosure. Those of ordinary skill in the art can also obtain other drawings based on these drawings without exerting creative work.

Figure 1:
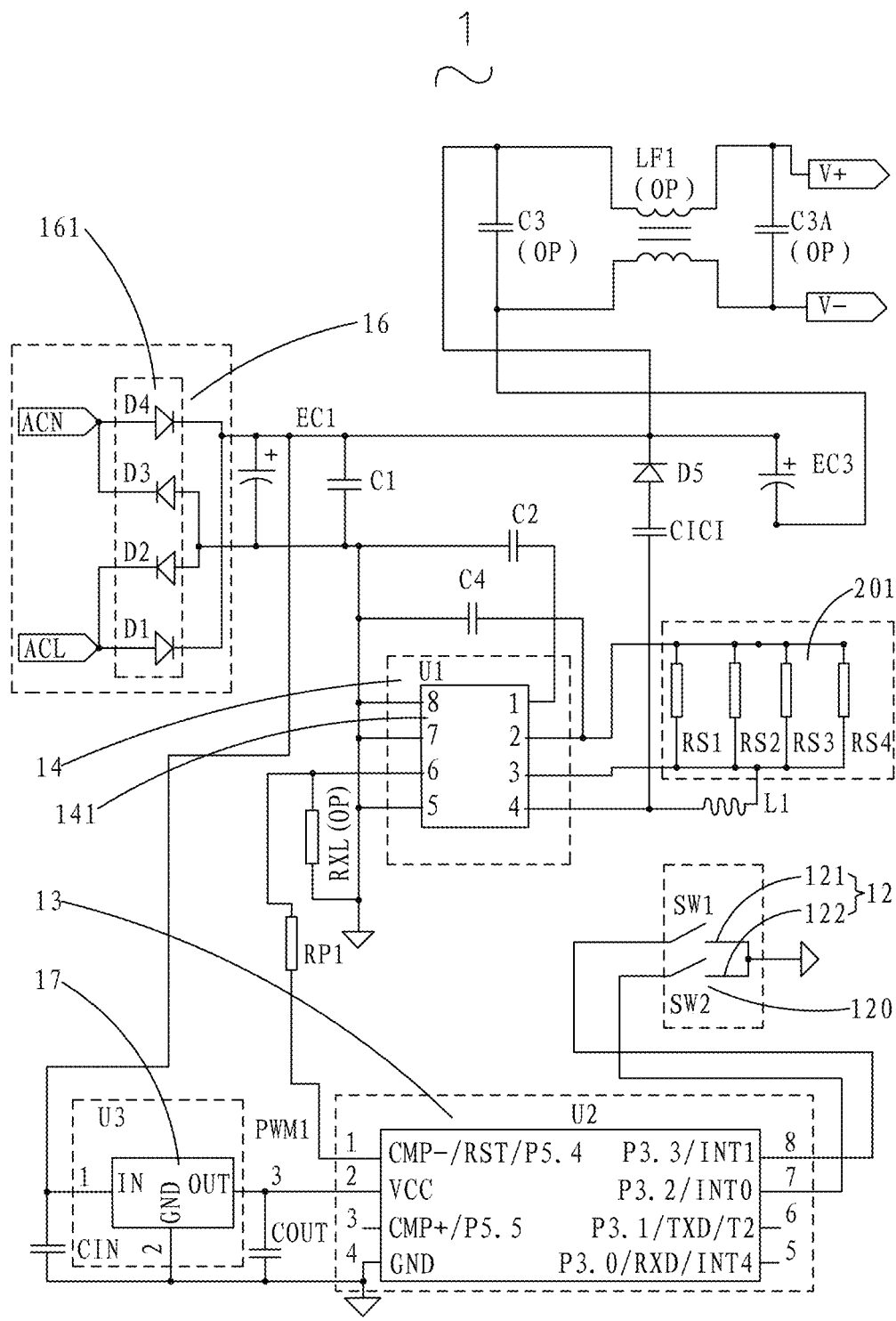
FIG. 1 is a circuit schematic diagram of a lamp circuit provided by a first embodiment of the present disclosure.

In the drawings, the parts represented by each number are listed as follows:

1. lamp circuit;
12. gear switch module; 13. control module; 14. drive module; 16. power supply; 17. voltage stabilizing module;
100. ground-insert lamp; 120. switch; 121. first switch; 122. second switch; 141. PWM constant current chip; 161. rectifier diode;
20. lamp body; 21. protective cover; 22. coaxial adjustment switch; 23. color-temperature adjustment switch; 24. luminous-flux adjustment switch; 25. first adjustment rod; 26. second adjustment rod; 27. partition; 28. base; 29. lens; 30. ground-insert member; 40. rotating seat; 50, input wire; 60, hollow connector;
201, light source assembly; 202, LED driver; 211, glue-filled sealant; 212, focus adjustment knob; 213, opening; 231, color-temperature adjustment knob; 241, luminous-flux gear knob; 251, first adjustment portion; 252, first toggle portion; 261, second adjustment portion; 262, second toggle portion; 271, first through hole; 281, first space; 282, second space; 283, second through hole; 284, first uniquely-shaped resistor; 285, second uniquely-shaped resistor; 291, sealing ring; 292, lens clamp;
2021, insulating layer; 2121, sealing member; 2621, third latching tooth; 2811, first spring piece; 2821, second spring piece; 2822, second limiting end; 2823, second limiting block; 2851, fourth latching tooth; 2852, second groove.

DETAILED DESCRIPTION

The technical solutions in the embodiments of the present disclosure will be clearly and completely described below with reference to the accompanying drawings in the embodiments of the present disclosure. Obviously, the described embodiments are part of the embodiments of the present disclosure, rather than all of the embodiments. Based on the embodiments in the present disclosure, all other embodiments obtained by those of ordinary skill in the art without creative efforts fall within the scope of protection of the present disclosure.

It should be noted that when an element is referred to as being "fixed" to another element, it can be directly on the other element or intervening elements may also be present. When an element is referred to be "connected" to another element, it can be directly connected to the other element or there may also be intervening elements present. The terms "vertical," "horizontal," "left," "right," and similar expressions are used herein for illustrative purposes only.

In the present disclosure, the orientations or positional relationships indicated by terms "on", "below", "left", "right", "front", "back", "top", "bottom", "inner", "outer", "middle", "vertical", "horizontal", "longitudinal", etc. are based on the orientations or positional relationships shown in the drawings. These terms are mainly used to better describe the present disclosure and its embodiments and are not intended to limit the indicated device, element or component to having a specific orientation, or to be constructed and operated in a specific orientation.

Moreover, some of the above terms may also be used to express other meanings in addition to indicating orientation or positional relationships. For example, the term "on" may also be used to express a certain dependence relationship or connection relationship in some cases. For those of ordinary skill in the art, the specific meanings of these terms in the present disclosure can be understood according to specific circumstances.

In addition, the terms "mount," "dispose," "provide," "connect" are to be construed broadly. For example, it can be a fixed connection, a detachable connection, or an integral structure; it can be a mechanical connection or an electrical connection; it can be a direct connection, an indirect connection through an intermediary, or an internal connection between two devices, elements or components. For those of ordinary skill in the art, the specific meanings of the above terms in the present disclosure can be understood according to specific circumstances.

Figure 2:
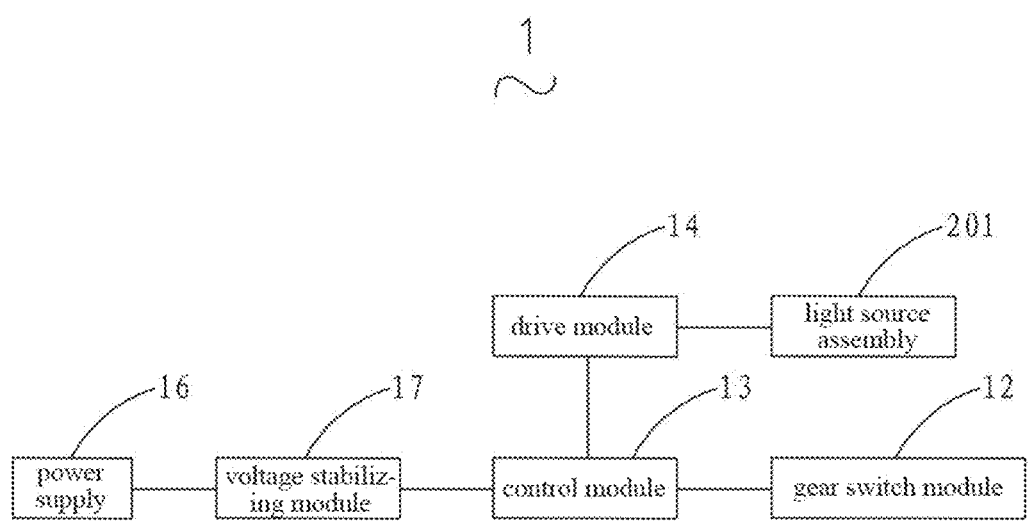
FIG. 2 is a circuit block diagram of the lamp circuit provided by the first embodiment of the present disclosure.

Please refer to FIGS. 1 and 2. A first embodiment of the present disclosure provides a lamp circuit 1, which includes a gear switch module 12, a control module 13, a drive module 14 and a light source assembly 201 that are electrically connected. The gear switch module 12 includes at least two switches 120. The drive module 14 is provided with a power supply end, an input end and an output end. The power supply end of the drive module 14 is connected to a power supply 16, the input end of the drive module 14 is connected to the output end of the control module 13, and the output end of the drive module 14 is connected to the input end of the light source assembly 201. The control module 13 is configured to generate different control signals based on the on-off states of the at least two switches 120, and the drive module 14 is configured to adjust the luminous flux of the light source assembly 201 based on different control signals.

As a preferred implementation, specifically, the control module 13 is configured to adjust the generated different control signals to be PWM signals with different duty cycles based on the on-off states of the at least two switches 120. Pulse Width Modulation (PWM for short) is a technology widely used in the field of electronics, which involves using digital signals generated by microprocessors or other digital controllers to control analog circuits. The core idea of PWM is to affect the shape and size of the output waveform by changing the duty cycle of a signal, thereby achieving the purpose of adjusting the voltage and frequency. In a PWM signal, the ratio of the high-level duration to the low-level duration of the signal is called the duty cycle, and the difference in the duty cycle will cause the average value of the output voltage to change accordingly.

Understandably, by connecting the input end of the drive module 14 to the output end of the control module 13, the control module 13 generates PWM signals with different duty cycles as control signals based on the on-off states of the at least two switches 120. The drive module 14 adjusts the luminous flux of the light source assembly 201 according to different control signals generated by the control module 13, effectively linking the specific on-off states of the at least two switches 120 of the gear switch module 12 with the luminous flux. The control module 13 generates control signals based on the on-off states, thereby improving the intelligence of the lamp circuit 1. The specific on-off states of the at least two switches 120 form different combinations corresponding to different control signals of the control module 13, allowing for more accurate luminous flux control and enhancing the overall intelligence, precision, and convenience of the lamp circuit 1 in adjusting luminous flux levels to meet specific demands.

Please continue to refer to FIGS. 1 and 2, further, the gear switch module 12 includes a first switch 121 and a second switch 122 connected in parallel.

Understandably, as a specific implementation, the gear switch module 12 is configured with two switches 120, namely the first switch 121 and the second switch 122, which are connected in parallel. The first switch 121 and the second switch 122 connected in parallel can change their respective on-off states to form various on-off combinations. The control module 13 detects the specific on-off states of the first switch 121 and the second switch 122 and generates different control signals to adjust the luminous flux of the light source assembly 201 to different levels. It should be noted that the number of the switches 120 in the gear switch module 12 can be increased to expand the range of on-off combinations, which allows the control module 13 to produce a wider variety of control signals, enhancing the precision of luminous flux regulation.

Please continue to refer to FIGS. 1 and 2, further, when the first switch 121 and the second switch 122 are both turned to an OFF state, the control module 13 generates a first control signal.

Understandably, when the control module 13 detects that the first switch 121 and the second switch 122 are both turned to an OFF state, the control module 13 will generate a first control signal, and the first control signal enables the drive module 14 to adjust the luminous flux of the light source assembly 201 to reach a maximum state, thereby adjusting the luminous flux more specifically according to the on-off state of the at least two switches 120 in the gear switch module 12.

Please continue to refer to FIGS. 1 and 2, further, when the first switch 121 is turned to an ON state and the second switch 122 is turned to an OFF state, the control module 13 generates a second control signal.

Understandably, when the control module 13 detects that the first switch 121 is turned to an ON state and the second switch 122 is turned to an OFF state, the control module 13 will generate a second control signal, and the second control signal enables the drive module 14 to adjust the luminous flux of the light source assembly 201 to reach an intermediate brightness state, further refining the adjustment mode of adjusting the luminous flux according to the on-off state of the at least two switches 120 of the gear switch module 12.

Please continue to refer to FIGS. 1 and 2, further, when the first switch 121 is turned to an OFF state and the second switch 122 is turned to an ON state, the control module 13 generates a third control signal.

Understandably, when the control module 13 detects that the first switch 121 is turned to an OFF state and the second switch 122 is turned to an ON state, the control module 13 will generate a third control signal, and the third control signal can enable the drive module 14 to adjust the luminous flux of the light source assembly 201 to a low-level brightness state, such that multi-level luminous flux adjustment by adjusting the luminous flux according to the on-off state of the at least two switches 120 in the gear switch module 12 can be realized.

Please continue to refer to FIGS. 1 and 2, further, the different control signals include a first control signal and/or a second control signal and/or a third control signal. The first control signal is a PWM signal with a duty cycle of 100%; the second control signal is a PWM signal with a duty cycle of 60%; and the third control signal is a PWM signal with a duty cycle of 30%.

As a preferred implementation, specifically, the relationship between the various on-off states of the first switch 121 and the second switch 122, and the corresponding control signals generated by the control module 13, is as follows: when both the first switch 121 and the second switch 122 are off, the control module 13 generates a PWM signal with a 100% duty cycle as the first control signal; when the first switch 121 is on and the second switch 122 is off, the control module 13 generates a PWM signal with a 60% duty cycle as the second control signal; and when the first switch 121 is off and the second switch 122 is on, the control module 13 generates a PWM signal with a duty cycle of 30% as the third control signal.

Understandably, the control module 13 determines the appropriate duty cycle signal to be output as a control signal according to the on-off states of the at least two switches 120 within the gear switch module 12. The control signal is then transmitted back to the drive module 14. The drive module 14 adjusts the duty cycle according to the control signal, regulating the duty cycle of the voltage signal supplied to the light source assembly 201 at a corresponding frequency. The on-off ratio of the circuit connected to the light source assembly 201 is utilized to manage the average voltage value of the voltage signal across the light source assembly 201. The duty cycle can be adjusted across three specific levels: 100%, 60%, and 30%. Increasing the duty cycle results in a rise in the average voltage value and luminous flux, while decreasing the duty cycle leads to a reduction in the average voltage value and luminous flux.

Please continue to refer to FIGS. 1 and 2, further, the lamp circuit 1 includes a voltage stabilizing module 17, the input end of the voltage stabilizing module 17 is electrically connected to the power supply 16, and the output end of the voltage stabilizing module 17 is electrically connected to the input end of the control module 13.

Understandably, the power supply 16, the voltage stabilizing module 17 and the control module 13 are electrically connected, allowing the voltage stabilizing module 17 to furnish a consistent operational voltage to the control module 13, which in turn enhances the operational reliability of the control module 13.

Please continue to refer to FIGS. 1 and 2, further, the power supply 16 is a DC power supply 16 obtained by rectifying an AC power through a rectifier diode 161.

Understandably, by providing the rectifier diode 161 to convert AC power into DC power, enhancements in the efficiency, stability, and noise reduction of the power supply 16 can be achieved. Furthermore, the rectifier diode 161's unidirectional conductivity serves to safeguard other components within lamp circuit 1 by automatically activating and short-circuiting reverse voltage, thereby preventing damage to the lamp circuit 1.

Please continue to refer to FIGS. 1 and 2, further, the drive module 14 includes a PWM constant current chip 141 electrically connected to the light source assembly 201.

Understandably, the utilization of the PWM constant current chip 141 is beneficial in delivering a consistent and dependable current to the light source assembly 201, which in turn plays a crucial role in maintaining the stable functionality of the light source assembly 201 and minimizing the influence of fluctuations in the luminous flux of the light emitted by the light source assembly 201.

Figure 3:
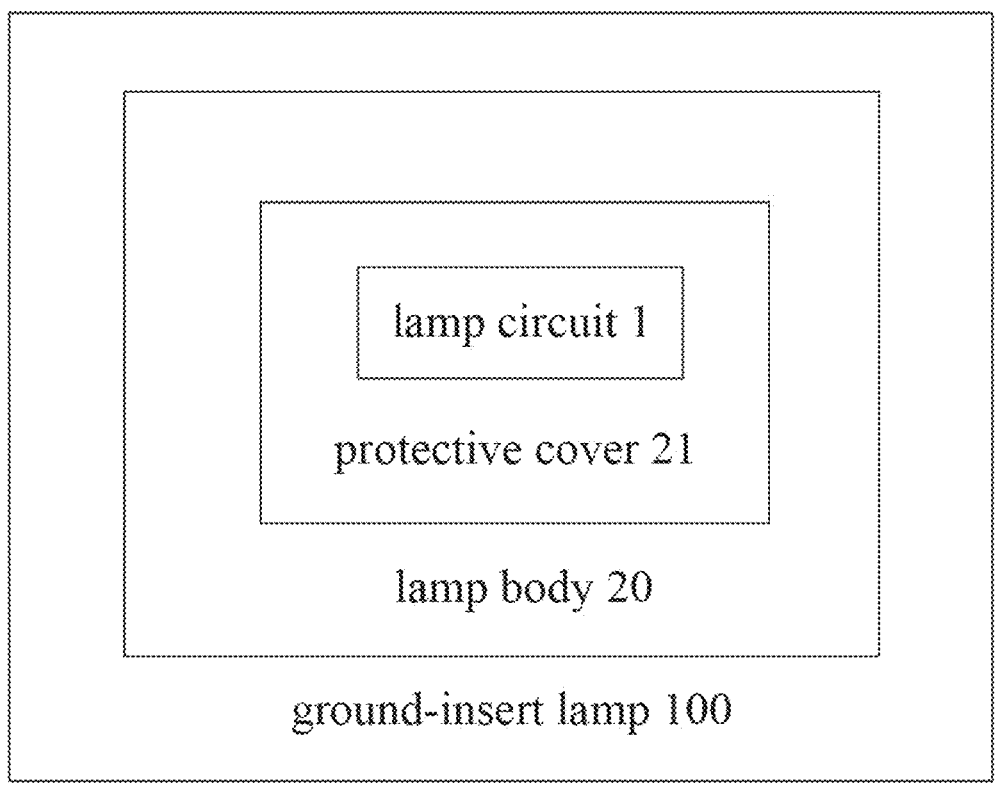
FIG. 3 is a structural schematic block diagram of a ground-insert lamp provided by a second embodiment of the present disclosure.

Please refer to FIGS. 1-3. A second embodiment of the present disclosure provides a ground-insert lamp 100. The ground-insert lamp 100 includes a lamp body 20. The lamp body 20 includes a protective cover 21 and a lamp circuit 1 arranged in the protective cover 21. The lamp circuit 1 includes a gear switch module 12, a control module 13, a drive module 14 and a light source assembly 201 that are electrically connected. The gear switch module 12 includes at least two switches 120, and the drive module 14 is provided with a power supply end, an input end and an output end. The power supply end of the drive module 14 is connected to the power supply 16, the input end of the drive module 14 is connected to the output end of the control module 13, and the output end of the drive module 14 is connected to the input end of the light source assembly 201. The control module 13 generates different control signals based on the on-off states of the at least two switches 120, and the drive module 14 adjusts the luminous flux of the light source assembly 201 based on different control signals. The lamp circuit 1 is housed within the protective cover 21 to enhance safety and extend the service life of the lamp circuit 1. Additionally, the ground-insert lamp 100 including the lamp circuit 1, enables more sophisticated, precise, and convenient control of the luminous flux.

Figure 4:
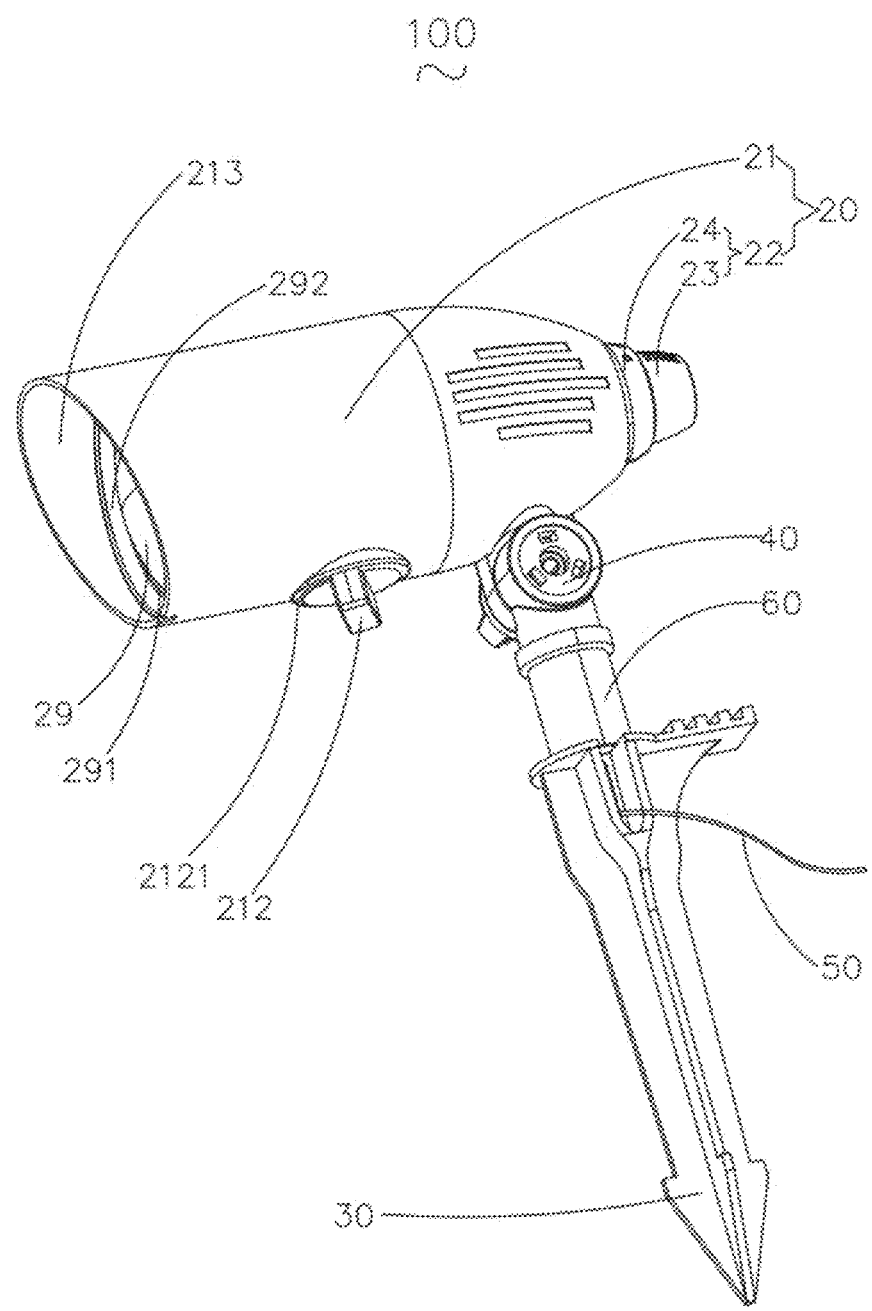
FIG. 4 is a perspective view of the ground-insert lamp provided by the second embodiment of the present disclosure.
Figure 5:
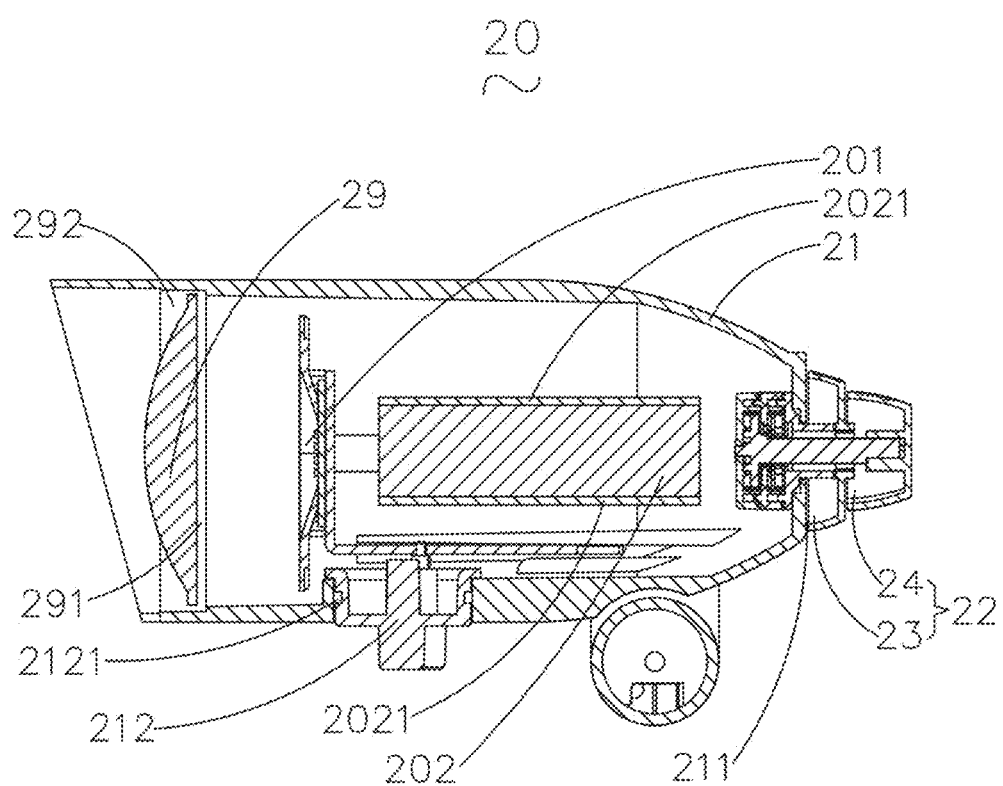
FIG. 5 is a perspective view of the lamp body of the ground-insert lamp provided by the second embodiment of the present disclosure.

Please refer to FIGS. 4 and 5. Further, the lamp body 20 also includes a coaxial adjustment switch 22, which is arranged at one end of the protective cover 21. The coaxial adjustment switch 22 is electrically connected to the lamp circuit 1. The coaxial adjustment switch 22 includes a coaxially arranged color-temperature adjustment switch 23 and a luminous-flux adjustment switch 24. The color-temperature adjustment switch 23 and the luminous-flux adjustment switch 24 are electrically connected to the lamp circuit 1.

Understandably, by incorporating a coaxial adjustment switch 22 that includes both a coaxial color-temperature adjustment switch 23 and a luminous-flux adjustment switch 24, the integration of the two switches simplifies the adjustment process and conserves space. The compact coaxial setting structure streamlines the adjustment steps, reduces the space needed for the color-temperature adjustment switch 23 and luminous-flux adjustment switch 24, enhances the ease of operation for adjusting color temperature and luminous flux, and effectively caters to users' simultaneous requirements for adjusting both color temperature and luminous flux. Additionally, by establishing electrical connections between the color-temperature adjustment switch 23, the luminous-lux adjustment switch 24, and the lamp circuit 1, the lamp circuit 1 can generate varied control signals based on the specific state of the luminous-flux adjustment switch 24, thereby regulating changes in luminous flux.

Please continue to refer to FIGS. 4 and 5, further, the ground-insert lamp 100 includes an LED driver 202, which is disposed in the protective cover 21 and electrically connected to the light source assembly 201. The light source assembly 201 is disposed on a side close to a lens 29, and the LED driver 202 is wrapped with an insulating layer 2021.

Understandably, by providing an insulating layer 2021 around the LED driver 202, it is possible to effectively prevent the LED driver 202 potential leakage and mitigate the risk of personal and property damage, further improving the safety of the ground-insert lamp 100 during operation.

Please refer to FIG. 4. Further, the ground-insert lamp 100 includes a ground-insert member 30. A rotating seat 40 is provided on one side of the lamp body 20 close to the ground-insert member 30. The rotating seat 40 is detachably connected to the ground-insert member 30 and can rotate relative to the ground-insert member 30.

Understandably, by providing a rotating seat 40 on the side of the lamp body 20 close to the ground-insert member 30, the rotating seat 40 and the ground-insert member 30 are detachably connected such that the ground-insert lamp 100 can be installed and disassembled more conveniently. The rotation of the rotating seat 40 with respect to the ground-insert member 30 permits adjustment of the lamp body 20 to an optimal angle, thereby enhancing the lighting adjustment capabilities of the ground-insert lamp 100.

Please continue to refer to FIGS. 4 and 5. Further, the ground-insert lamp 100 includes an input wire 50 and a hollow connector 60. The hollow connector 60 is arranged between the lamp body 20 and the ground-insert member 30 and is connected to the lamp body 20 and the ground-insert member 30. One end of the input wire 50 is exposed out of the ground-insert member 30, and the other end thereof passes through the hollow connector 60 and extends into the protective cover 21 to be electrically connected to the wire corresponding to the light source assembly 201.

Understandably, the threading structure implemented in the aforementioned arrangement enhances the protection and durability of the input wire 50, thereby contributing to improved safety.

Figure 6:
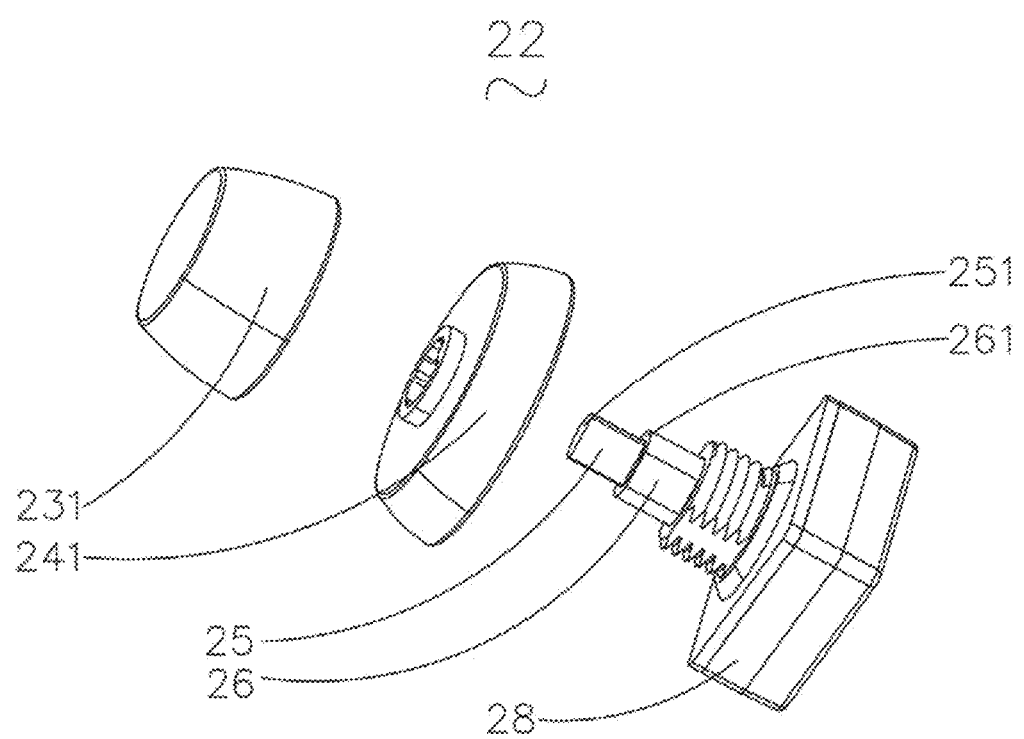
FIG. 6 is an exploded view of the coaxial adjustment switch of the ground-insert lamp provided by the second embodiment of the present disclosure.

Please refer to FIGS. 5 and 6. Further, the color-temperature adjustment switch 23 includes a color-temperature adjustment knob 231. The luminous-flux adjustment switch 24 includes a luminous-flux gear knob 241. The coaxial adjustment switch 22 also includes a first adjustment rod 25 and a second adjustment rod 26 arranged coaxially. The first adjustment rod 25 includes a first adjustment portion 251 extending out of the protective cover 21, and the second adjustment rod 26 includes a second adjustment portion 261 extending out of the protective cover 21. The color-temperature adjustment knob 231 is sleeved on one of the first adjustment portion 251 and the second adjustment portion 261, and the luminous-flux gear knob 241 is sleeved on the other of the first adjustment portion 251 and the second adjustment portion 261.

It should be noted that the color-temperature adjustment knob 231 can be sleeved on the first adjustment portion 251, and the luminous-flux gear knob 241 can be sleeved on the second adjustment portion 261; or the color-temperature adjustment knob 231 can be sleeved on the second adjustment portion 261, and the luminous-flux gear knob 241 can be mounted on the first adjustment portion 251. Hereinafter, a specific description is given by taking the example that the color-temperature adjustment knob 231 is sleeved on the first adjustment portion 251 and the luminous-flux gear knob 241 is sleeved on the second adjustment portion 261.

Understandably, users can modify the color temperature and luminous flux by simply rotating the coaxial color-temperature adjustment knob 231 and the luminous-flux gear knob 241, which are visible on the exterior of the protective cover 21. This allows for the adjustment of the key lighting parameters of color temperature and luminous flux. The color-temperature adjustment knob 231 and the luminous-flux gear knob 241 are labeled with corresponding indicators for color temperature and luminous flux, facilitating precise and straightforward adjustment operations.

Please refer to FIGS. 1 and 5 to 9. Further, the first adjustment rod 25 also includes a first toggle portion 252 arranged in the protective cover 21, and the second adjustment rod 26 also includes a second toggle portion 262 arranged in the protective cover 21. The first adjustment rod 25 is inserted into the second adjustment rod 26, and the first adjustment portion 251 and the first toggle portion 252 are exposed from the second adjustment portion 261 and the second toggle portion 262 respectively. The coaxial adjustment switch 22 also includes a base 28, and the base 28 is provided with a partition 27. The partition 27 divides the base 28 into a first space 281 and a second space 282. A first through hole 271 is provided at the center of the partition 27, and a second through hole 283 is provided on the side of the base 28 close to the first adjustment portion 251. The first toggle portion 252 passes through the second through hole 283 and the first through hole 271 in sequence to extend into the first space 281, and the second toggle portion 262 passes through the second through hole 283 to extend into the second space 282. A first spring piece 2811 and a second spring piece 2821 electrically connected to the outside circuit are respectively provided in the first space 281 and the second space 282, and the first toggle portion 252 and the second toggle portion 262 are respectively connected to a first uniquely-shaped resistor 284 and a second uniquely-shaped resistor 285. The first spring piece 2811 abuts against the first toggle portion 252 and/or the first uniquely-shaped resistor 284, and the second spring piece 2821 abuts against the second toggle portion 262 and/or the second uniquely-shaped resistor 285.

Understandably, the above configuration allows for the manipulation of the coaxial adjustment switch 22 by utilizing the color-temperature adjustment knob 231 and the luminous-flux gear knob 241 to individually adjust the coaxial first adjustment rod 25 and the second adjustment rod 26. The first toggle portion 252 and the second toggle portion 262 drive the rotation of the first uniquely-shaped resistor 284 and the second uniquely-shaped resistor 285, causing the first spring piece 2811 to either make contact with the first toggle portion 252 and the first uniquely-shaped resistor 284 or solely with the first toggle portion 252, and the second spring piece 2821 to either make contact with the second toggle portion 262 and the second uniquely-shaped resistor 285 or solely with the second toggle portion 262. When the first uniquely-shaped resistor 284 makes contact with the first spring piece 2811 at various points, and the second uniquely-shaped resistor 285 makes contact with the second spring piece 2821 at various points, the resistance values at these contact points vary accordingly. The circuit is open when only the first toggle portion 252 and the second toggle portion 262 make contact with the corresponding first uniquely-shaped resistor 284 and second uniquely-shaped resistor 285. This configuration allows for the adjustment of circuit resistance values by manipulating the color-temperature adjustment knob 231 and the luminous-flux gear knob 241. The integration of the color temperature and luminous flux adjustment functions through the coaxial arrangement of the first adjustment rod 25 and the second adjustment rod 26 simplifies the structure of the coaxial adjustment switch 22, facilitating ease of operation. The gear switch module 12 includes at least two switches 120, each switch 120 is composed of a second spring piece 2821 abutting against a second toggle portion 262 and/or a second uniquely-shaped resistor 285. When the luminous flux position knob 241 is adjusted, the rotation of the luminous flux position knob 241 drives the second adjustment rod 26 to drive the second toggle portion 262 and the second uniquely-shaped resistor 285 to rotate. The switch 120 is turned to an OFF state when the second spring piece 2821 only contacts the second toggle portion 262 but not the second uniquely-shaped resistor 285, and turned to an ON state when the second spring piece 2821 contacts both the second toggle portion 262 and the second uniquely-shaped resistor 285. Consequently, the switch 120's on-off states change based on the luminous-flux gear knob 241's adjustment position. Subsequently, the control module 13 can generate and transmit various control signals depending on the on-off states of the at least two switches 120, and the drive module 14 can regulate the luminous flux of the light source assembly 201 according to different control signals.

Please refer to FIGS. 1 and 9 to FIG. 12, as a specific implementation, the gear switch module 12 includes a first switch 121 and a second switch 122 connected in parallel. The first switch 121 includes a second spring piece 2821a and the second toggle portion 262 and/or the second uniquely-shaped resistor 285, and the second switch 122 includes another second spring piece 2821b and the second toggle portion 262 and/or the second uniquely-shaped resistor 285. The second uniquely-shaped resistor 285 includes a plurality of fourth latching teeth 2851, when one fourth latching tooth 2851a contacts the second spring piece 2821a, the first switch 121 is turned on, and when the fourth latching tooth 2851a is separated from the second spring piece 2821a, the first switch 121 is turned off; when another fourth latching tooth 2851b contacts the second spring piece 2821b, the second switch 122 is turned on, and when the fourth latching tooth 2851b is separated from the second spring piece 2821b, the second switch 122 is turned off. By manipulating the luminous-flux gear knob 241 to drive the second toggle portion 262 and the second uniquely-shaped resistor 285 to rotate, the fourth latching tooth 2851a can either abut against or disconnect from the second spring piece 2821a, and the fourth latching tooth 2851b can either abut against or disconnect from the second spring piece 2821b, which allows for various on-off configurations between the first switch 121 and the second switch 122.

Figure 9:
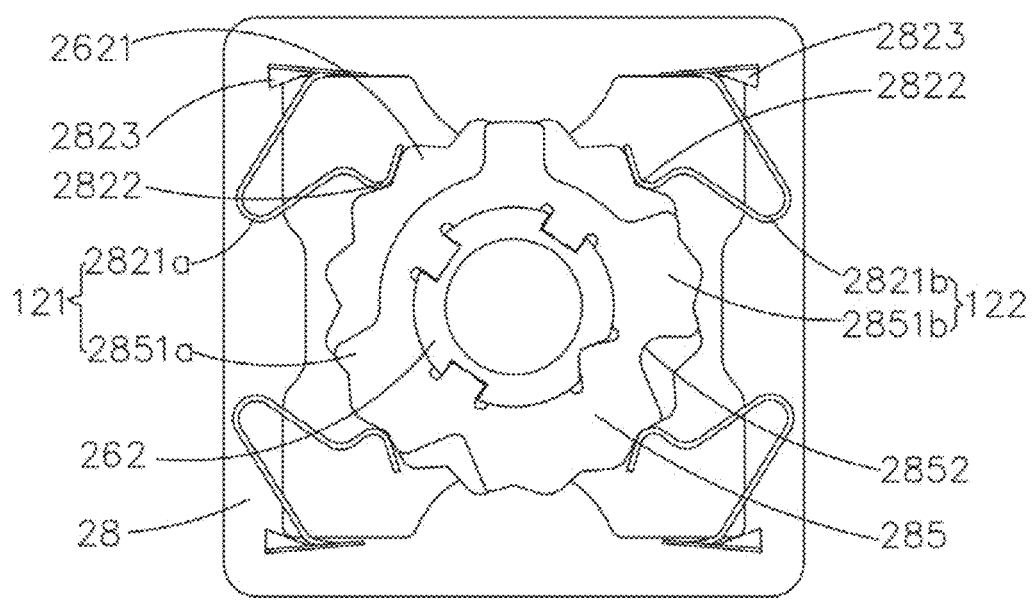
FIG. 9 is a first front view of a cooperation between the second adjustment rod, the base, the second spring piece and the second uniquely-shaped resistor of the ground-insert lamp provided by the second embodiment of the present disclosure.

Specifically, please refer to FIG. 9, the position where the second uniquely-shaped resistor 285 rotates to a position where the fourth latching tooth 2851a does not abut against the second spring piece 2821a, and the fourth latching tooth 2851b does not abut against the second spring piece 2821b is defined as a first position. When the second uniquely-shaped resistor 285 is rotated to the first position, the first switch 121 and the second switch 122 are both turned to an OFF state, and the electrically connected control module 13 generates the first control signal.

Figure 10:
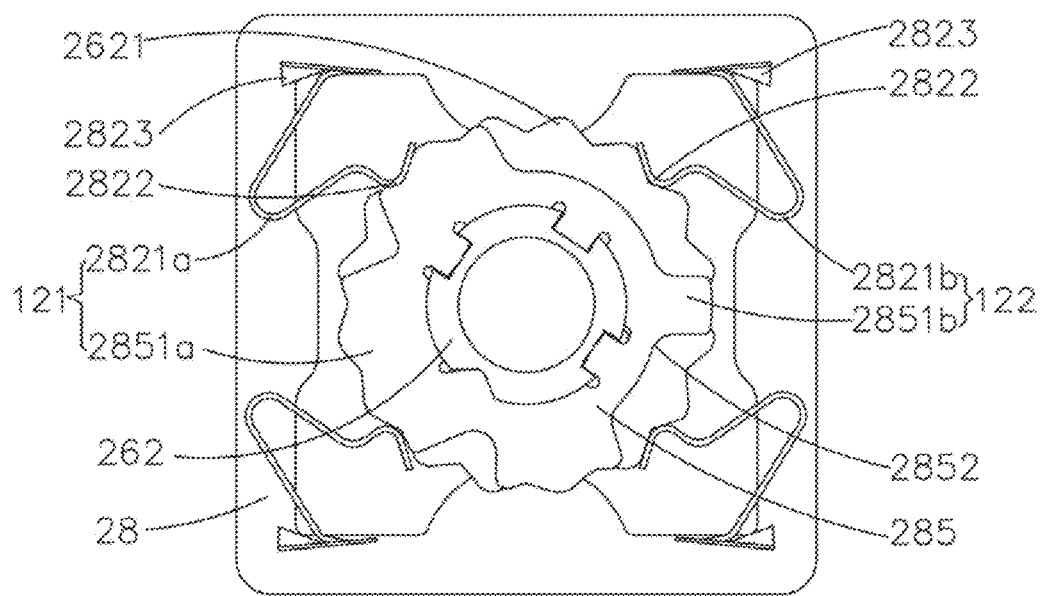
FIG. 10 is a second front view of a cooperation between the second adjustment rod, the base, the second spring piece and the second uniquely-shaped resistor of the ground-insert lamp provided in the second embodiment of the present disclosure.

Specifically, please refer to FIG. 10, the position where the second uniquely-shaped resistor 285 rotates to a position where the fourth latching tooth 2851a abuts against the second spring piece 2821a, and the fourth latching tooth 2851b does not abut against the second spring piece 2821b is defined as a second position. When the second uniquely-shaped resistor 285 rotates to the second position, the first switch 121 is turned to an ON state and the second switch 122 is turned to an OFF state, and the electrically connected control module 13 generates the second control signal.

Figure 11:
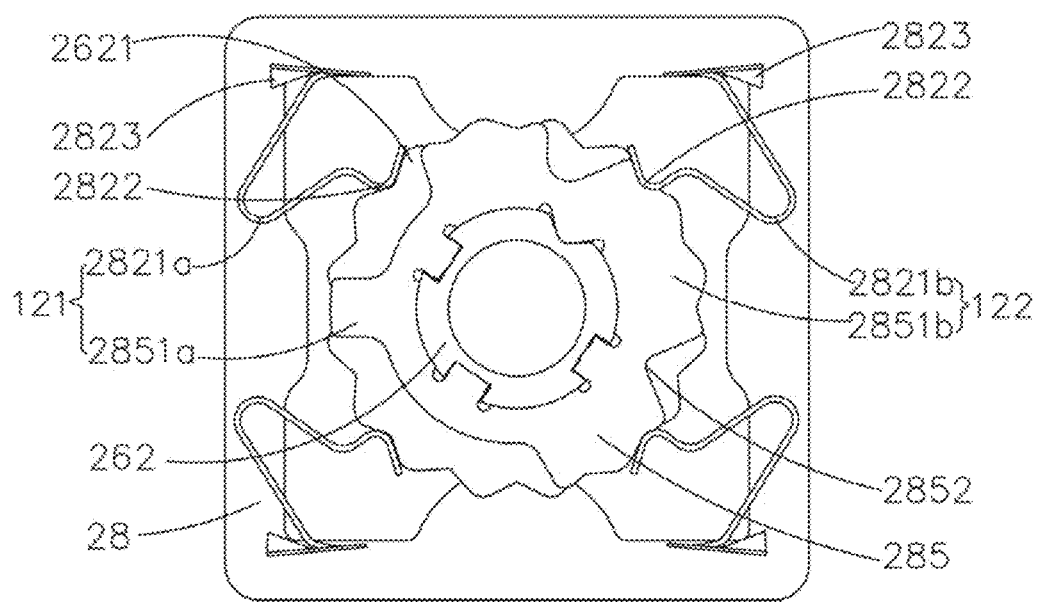
FIG. 11 is a third front view of a cooperation between the second adjustment rod, the base, the second spring piece and the second uniquely-shaped resistor of the ground-insert lamp provided in the second embodiment of the present disclosure.

Specifically, please refer to FIG. 11, the position where the second uniquely-shaped resistor 285 rotates to a position where the fourth latching tooth 2851a does not abut against the second spring piece 2821a, and the fourth latching tooth 2851b abuts against the second spring piece 2821b is defined as a third position. When the second uniquely-shaped resistor 285 rotates to the third position, the first switch 121 is turned to an OFF state and the second switch 122 is turned to an ON state, and the electrically connected control module 13 generates the third control signal.

Figure 12:
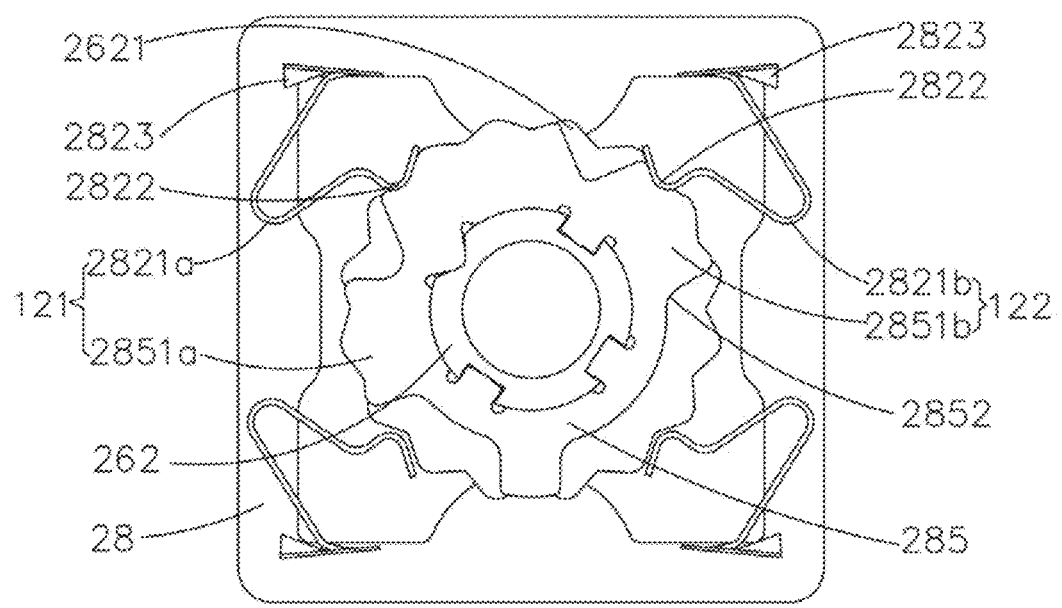
FIG. 12 is a fourth front view of a cooperation between the second adjustment rod, the base, the second spring piece and the second uniquely-shaped resistor of the ground-insert lamp provided in the second embodiment of the present disclosure.

Specifically, please refer to FIG. 12, the position where the second uniquely-shaped resistor 285 rotates to a position where the fourth latching tooth 2851a abuts against the second spring piece 2821a, and the fourth latching tooth 2851b abuts against the second spring piece 2821b is defined as a fourth position. When the second uniquely-shaped resistor 285 rotates to the fourth position, the first switch 121 and the second switch 122 are both turned to an ON state.

Please refer to FIGS. 6 to 9, further, the side surface of the second toggle portion 262 axially parallel to the second adjustment rod 26 is provided with a third latching tooth 2621, the side surface of the second uniquely-shaped resistor 285 axially parallel to the second adjustment rod 26 is provided with at least two groups of fourth latching teeth 2851, and a second groove 2852 is provided between the fourth latching teeth 2851. The end of the second spring piece 2821 abutting against the second toggle portion 262 and the second uniquely-shaped resistor 285 is the second limiting end 2822, and the second limiting end 2822 abuts against the third latching tooth 2621 and the fourth latching tooth 2851. The second limiting end 2822 can abut against the third latching tooth 2621 and the fourth latching tooth 2851. When the second toggle portion 262 rotates to a certain angle, the second groove 2852 corresponds to the second limiting end 2822, such that the second limiting end 2822 can only abut against the third latching tooth 2621. That is, when the second groove 2852 rotates to a position corresponding to the second limiting end 2822, the second limiting end 2822 will only abuts against the third latching tooth 2621. The second toggle portion 262 is an insulator. In this case, the second limiting end 2822 cannot abut against the fourth latching tooth 2851, thereby forming a circuit break. Thus, by adjusting the luminous-flux gear knob 241 to drive the second adjustment rod 26 to rotate, the second spring piece 2821 can be in contact with both the third latching tooth 2621 and the fourth latching tooth 2851 or only with the third latching tooth 2621, thereby achieving on-off state adjustment, making the adjustment more accurate and effective.

Figure 7:
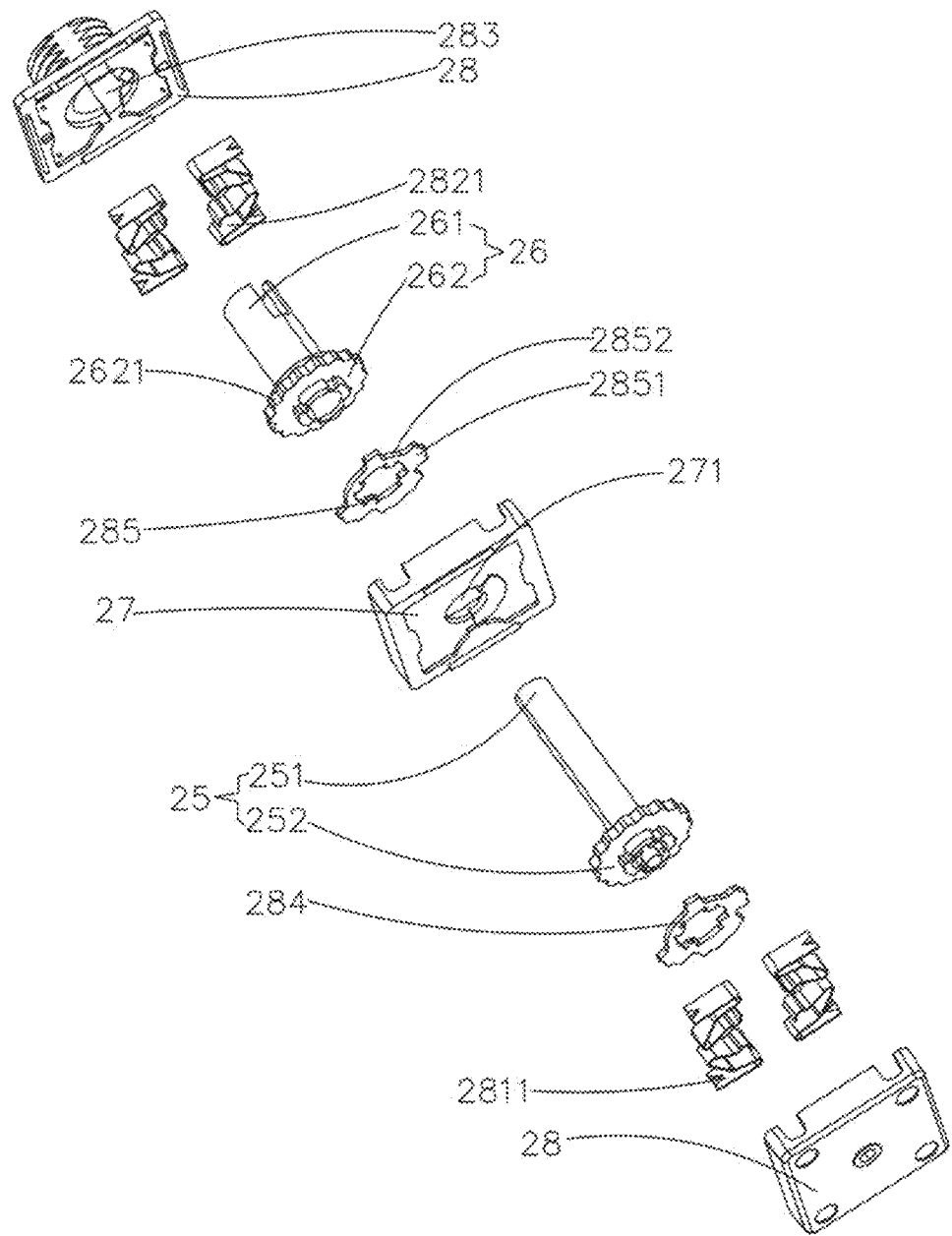
FIG. 7 is an exploded view of part of the coaxial adjustment switch of the ground-insert lamp provided by the second embodiment of the present disclosure.

Please refer to FIGS. 7 and 9. Further, the shape of the second limiting end 2822 is a curved shape corresponding to the shape of the third latching tooth 2621 and the fourth latching tooth 2851. A second limiting block 2823 is provided in the base 28, and one end of the second spring piece 2821 away from the second limiting end 2822 abuts against the second limiting block 2823. The shapes of the third latching tooth 2621 and the fourth latching tooth 2851 match the shape of the second limiting end 2822, and the bending degree of the second limiting end 2822 corresponds to the bending degree of the third latching tooth 2621 and the fourth latching tooth 2851, such that the third latching tooth 2621 and the fourth latching tooth 2851 can be well in contact with the second limiting end 2822 whether rotating forward or reverse, and will not be stuck and unable to rotate. Therefore, the improved alignment of the second limiting end 2822 with the third latching tooth 2621 and the fourth latching tooth 2851 allows for flexible cooperation of the relative rotation between the second spring piece 2821 and the third latching tooth 2621 and the fourth latching tooth 2851 in both positive and negative directions, which ensures secure and stable positioning of the second spring piece 2821 within the base 28, preventing any potential loosening.

Figure 8:
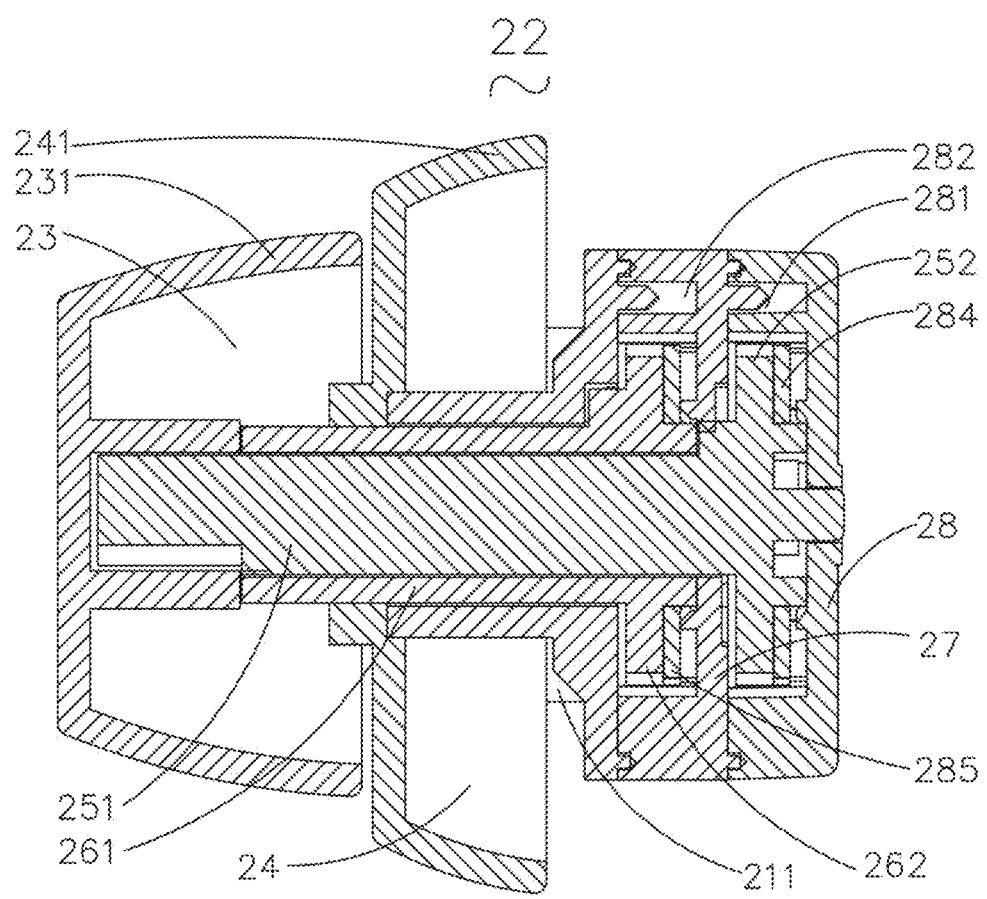
FIG. 8 is a cross-sectional view of the coaxial adjustment switch of the ground-insert lamp provided by the second embodiment of the present disclosure.

Please refer to FIG. 4 and FIG. 8, further, a glue-filled sealant 211 is provided at the connection between the color-temperature adjustment knob 231 and the luminous-flux gear knob 241 and the protective cover 21.

Understandably, the glue-filled sealant 211 is provided at a position where the color-temperature adjustment knob 231 and the luminous-flux gear knob 241 are connected to the protective cover 21, specifically, a sealant can be applied to seal and fill in order to create the glue-filled sealant 211, effectively closing the configuration gap for dustproof and waterproof protection and enhancing the longevity of the ground-insert lamp 100.

Figure 13:
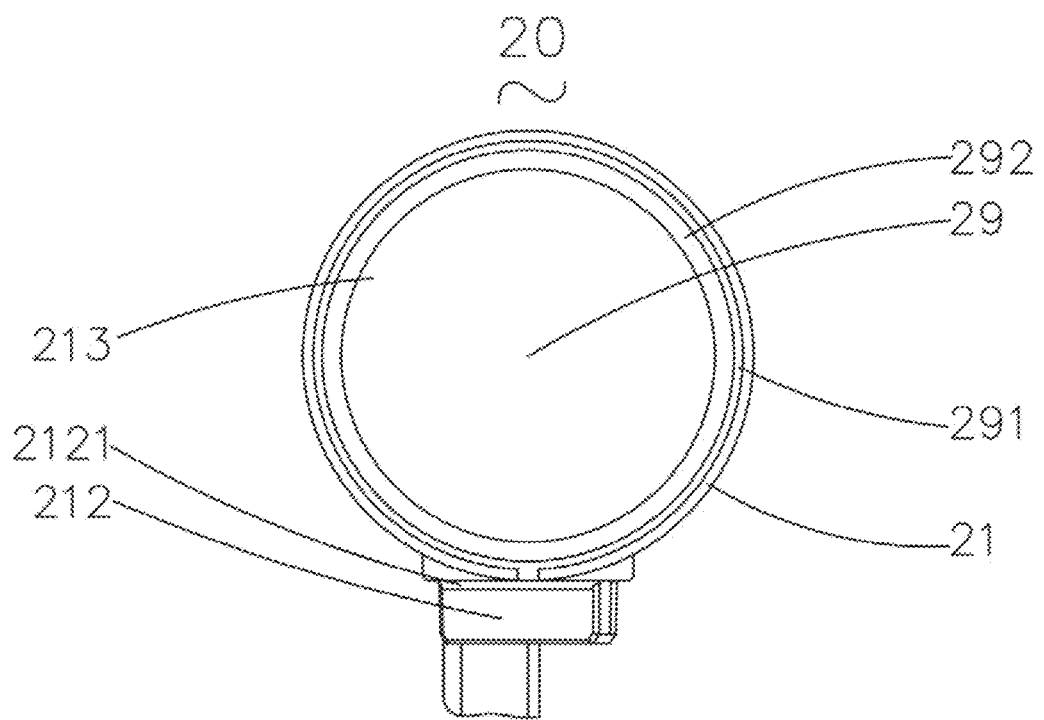
FIG. 13 is a front view of the lamp body of the ground-insert lamp provided in the second embodiment of the present disclosure.

Please refer to FIGS. 4, 5 and 13. Further, the lamp body 20 also includes a focus adjustment knob 212 and a lens 29. The focus adjustment knob 212 is arranged on a side of the protective cover 21 close to the ground-insert member 30. An opening 213 is opened at one end of the protective cover 21 away from the coaxial adjustment switch 22, and the opening 213 accommodates the lens 29.

Understandably, the lens 29 is provided at the opening 213 of the protective cover 21 away from the coaxial adjustment switch 22, and the focus adjustment knob 212 is provided on the side of the protective cover 21 close to the ground-insert member 30, the focal length of the lens 29 can be adjusted by adjusting the focus adjustment knob 212, such that varying illumination angles can be realized to meet diverse lighting requirements of users.

Please continue to refer to FIGS. 4, 5 and 13, further, a sealing ring 291 and a lens clamp 292 are provided at one end of the lens 29 close to the opening 213.

Understandably, by placing a sealing ring 291 near the opening 213 at one end of the lens 29, a waterproof and dustproof seal is established to prevent the ingress of water vapor or dust into the inner portion of the lens 29, thereby safeguarding the lighting efficiency of light transmitted through the lens 29. Additionally, the lens clamp 292 serves to restrict the positioning of the lens 29, enhancing the structural stability of the positional arrangement thereof.

Please refer to FIG. 4 and FIG. 13, further, a sealing member 2121 is provided at the connection between the focus adjustment knob 212 and the protective cover 21.

Understandably, by providing a sealing member 2121 at the connection of the focus adjustment knob 212 and the protective cover 21, it is possible to create a waterproof and dustproof barrier, which ensures that a sealed environment is established within the protective cover 21, safeguarding it from external elements and consequently enhancing the longevity of the ground-insert lamp 100.

Compared with the prior art, the lamp circuit and the ground-insert lamp provided in the embodiments of the present disclosure have the following advantages.

An embodiment of the present disclosure provides a lamp circuit, which includes a gear switch module, a control module, a drive module and a light source assembly that are electrically connected. The gear switch module includes at least two switches. The drive module is provided with a power supply end, an input end and an output end. The power supply end of the drive module is connected to a power supply, the input end of the drive module is connected to the output end of the control module, and the output end of the drive module is connected to the input end of the light source assembly. The control module is configured to generate different control signals based on the on-off states of the at least two switches, and the drive module is configured to adjust the luminous flux of the light source assembly based on different control signals. By connecting the input end of the drive module to the output end of the control module, the control module generates PWM signals with different duty cycles as control signals based on the on-off states of the at least two switches. The drive module adjusts the luminous flux of the light source assembly according to different control signals generated by the control module, effectively linking the specific on-off states of the at least two switches of the gear switch module with the luminous flux. The control module generates control signals based on the on-off states, thereby improving the intelligence of the lamp circuit. The specific on-off states of the at least two switches form different combinations corresponding to different control signals of the control module, allowing for more accurate luminous flux control and enhancing the overall intelligence, precision, and convenience of the lamp circuit in adjusting luminous flux levels to meet specific demands.

In an embodiment of the present disclosure, the gear switch module includes a first switch and a second switch connected in parallel. The first switch and the second switch connected in parallel can change their respective on-off states to form various on-off combinations. The control module detects the specific on-off states of the first switch and the second switch and generates different control signals to adjust the luminous flux of the light source assembly to different levels.

In an embodiment of the present disclosure, when the first switch and the second switch are both turned to an OFF state, the control module generates a first control signal; when the first switch is turned to an ON state and the second switch is turned to an OFF state, the control module generates a second control signal; when the first switch is turned to an OFF state and the second switch is turned to an ON state, the control module generates a third control signal. The control module regulates the output of the first, second, or third control signal based on the on-off states detected from the first and second switches, such that the driving module can adjust the luminous flux of the light source assembly to achieve maximum, medium, or low levels. Consequently, this enables a more precise adjustment of the luminous flux based on the various on-off states of the gear switch module.

In an embodiment of the present disclosure, the lamp circuit further includes a voltage stabilizing module, the input end of the voltage stabilizing module is electrically connected to the power supply, and the output end of the voltage stabilizing module is electrically connected to the input end of the control module. By providing a voltage stabilizing module, an electrical connection is established between the power supply, the voltage stabilizing module, and the control module, which allows the voltage stabilizing module to deliver a consistent operating voltage to the control module, consequently enhancing the operational reliability of the control module.

In an embodiment of the present disclosure, the power supply is a DC power supply obtained by rectifying an AC power through a rectifier diode. By providing the rectifier diode to convert AC power into DC power, enhancements in the efficiency, stability, and noise reduction of the power supply can be achieved. Furthermore, the rectifier diode's unidirectional conductivity serves to safeguard other components within the lamp circuit by automatically activating and short-circuiting reverse voltage, thereby preventing damage to the lamp circuit.

In an embodiment of the present disclosure, the different control signals include a first control signal and/or a second control signal and/or a third control signal. The first control signal is a PWM signal with a duty cycle of 100%; the second control signal is a PWM signal with a duty cycle of 60%; and the third control signal is a PWM signal with a duty cycle of 30%. the control module selects to output the corresponding duty cycle signal as a control signal based on the on-off state of at least two switches of the gear switch module, and feeds it back to the drive module. The drive module changes the duty cycle according to the control signal, and controls the duty cycle of the voltage signal applied to the light source assembly with the corresponding frequency. The ratio of the on and off of the circuit connected to the light source assembly is used to control the voltage average value of the voltage signal on the light source assembly. The duty cycle is specifically adjustable in three gears of 100%, 60%, and 30%. When the duty cycle is increased, the voltage average value increases and the luminous flux increases; conversely, when the duty cycle is reduced, the voltage average value decreases and the luminous flux decreases.

In an embodiment of the present disclosure, the drive module includes a PWM constant current chip electrically connected to the light source assembly, the utilization of the PWM constant current chip is beneficial in delivering a consistent and dependable current to the light source assembly, which in turn plays a crucial role in maintaining the stable functionality of the light source assembly and minimizing the influence of fluctuations in the luminous flux of the light emitted by the light source assembly.

In an embodiment of the present disclosure, a ground-insert lamp is provided, which includes a lamp body. The lamp body includes a protective cover and a lamp circuit arranged in the protective cover. The lamp circuit includes a gear switch module, a control module, a drive module and a light source assembly that are electrically connected. The gear switch module includes at least two switches, and the drive module is provided with a power supply end, an input end and an output end. The power supply end of the drive module is connected to the power supply, the input end of the drive module is connected to the output end of the control module, and the output end of the drive module is connected to the input end of the light source assembly. The control module generates different control signals based on the on-off states of the at least two switches, and the drive module adjusts the luminous flux of the light source assembly based on different control signals. The lamp circuit is housed within the protective cover to enhance safety and extend the service life of the lamp circuit. Additionally, the ground-insert lamp including the lamp circuit, enables more sophisticated, precise, and convenient control of the luminous flux.

In an embodiment of the present disclosure, the lamp body also includes a coaxial adjustment switch, which is arranged at one end of the protective cover. The coaxial adjustment switch is electrically connected to the lamp circuit. The coaxial adjustment switch includes a coaxially arranged color-temperature adjustment switch and a luminous-flux adjustment switch. The color-temperature adjustment switch and the luminous-flux adjustment switch are electrically connected to the lamp circuit. By incorporating a coaxial adjustment switch that includes both a coaxial color-temperature adjustment switch and a luminous-flux adjustment switch, the integration of the two switches simplifies the adjustment process and conserves space. The compact coaxial setting structure streamlines the adjustment steps, reduces the space needed for the color-temperature adjustment switch and luminous-flux adjustment switch, enhances the ease of operation for adjusting color temperature and luminous flux, and effectively caters to users' simultaneous requirements for adjusting both color temperature and luminous flux. Additionally, by establishing electrical connections between the color-temperature adjustment switch, the luminous-lux adjustment switch, and the lamp circuit, the lamp circuit can generate varied control signals based on the specific state of the luminous-flux adjustment switch, thereby regulating changes in luminous flux.

In an embodiment of the present disclosure, the color-temperature adjustment switch includes a color-temperature adjustment knob. The luminous-flux adjustment switch includes a luminous-flux gear knob. The coaxial adjustment switch also includes a first adjustment rod and a second adjustment rod arranged coaxially. The first adjustment rod includes a first adjustment portion extending out of the protective cover, and the second adjustment rod includes a second adjustment portion extending out of the protective cover. The color-temperature adjustment knob is sleeved on one of the first adjustment portion and the second adjustment portion, and the luminous-flux gear knob is sleeved on the other of the first adjustment portion and the second adjustment portion. Thus, users can modify the color temperature and luminous flux by simply rotating the coaxial color-temperature adjustment knob and the luminous-flux gear knob, which are visible on the exterior of the protective cover. This allows for the adjustment of the key lighting parameters of color temperature and luminous flux. The color-temperature adjustment knob and the luminous-flux gear knob are labeled with corresponding indicators for color temperature and luminous flux, facilitating precise and straightforward adjustment operations.

In an embodiment of the present disclosure, the first adjustment rod also includes a first toggle portion arranged in the protective cover, and the second adjustment rod also includes a second toggle portion arranged in the protective cover. The first adjustment rod is inserted into the second adjustment rod, and the first adjustment portion and the first toggle portion are exposed from the second adjustment portion and the second toggle portion respectively. The coaxial adjustment switch also includes a base, and the base is provided with a partition. The partition divides the base into a first space and a second space. A first through hole is provided at the center of the partition, and a second through hole is provided on the side of the base close to the first adjustment portion. The first toggle portion passes through the second through hole and the first through hole in sequence to extend into the first space, and the second toggle portion passes through the second through hole to extend into the second space. A first spring piece and a second spring piece electrically connected to the outside circuit are respectively provided in the first space and the second space, and the first toggle portion and the second toggle portion are respectively connected to a first uniquely-shaped resistor and a second uniquely-shaped resistor. The first spring piece abuts against the first toggle portion and/or the first uniquely-shaped resistor to form a first switch, and the second spring piece abuts against the second toggle portion and/or the second uniquely-shaped resistor to form a second switch. The gear switch module is either the first switch or the second switch. The above configuration allows for the manipulation of the coaxial adjustment switch by utilizing the color-temperature adjustment knob and the luminous-flux gear knob to individually adjust the coaxial first adjustment rod and the second adjustment rod. The first toggle portion and the second toggle portion drive the rotation of the first uniquely-shaped resistor and the second uniquely-shaped resistor, causing the first spring piece to either make contact with the first toggle portion and the first uniquely-shaped resistor or solely with the first toggle portion, and the second spring piece to either make contact with the second toggle portion and the second uniquely-shaped resistor or solely with the second toggle portion. When the first uniquely-shaped resistor makes contact with the first spring piece at various points, and the second uniquely-shaped resistor makes contact with the second spring piece at various points, the resistance values at these contact points vary accordingly. The circuit is open when only the first toggle portion and the second toggle portion make contact with the corresponding first uniquely-shaped resistor and second uniquely-shaped resistor. This configuration allows for the adjustment of circuit resistance values by manipulating the color-temperature adjustment knob and the luminous-flux gear knob. The integration of the color temperature and luminous flux adjustment functions through the coaxial arrangement of the first adjustment rod and the second adjustment rod simplifies the structure of the coaxial adjustment switch, facilitating ease of operation. The gear switch module is either the first switch module or the second switch module, allowing for the adjustment of circuit resistance based on varying contact configurations to facilitate the transition between different gear switches.

In an embodiment of the present disclosure, the side surface of the second toggle portion axially parallel to the second adjustment rod is provided with a third latching tooth, the side surface of the second uniquely-shaped resistor axially parallel to the second adjustment rod is provided with at least two groups of fourth latching teeth, and a second groove is provided between the fourth latching teeth. The end of the second spring piece abutting against the second toggle portion and the second uniquely-shaped resistor is the second limiting end, and the second limiting end abuts against the third latching tooth and the fourth latching tooth. The second limiting end can abut against the third latching tooth and the fourth latching tooth. When the second toggle portion rotates to a certain angle, the second groove corresponds to the second limiting end, such that the second limiting end can only abut against the third latching tooth. Thus, by adjusting the luminous-flux gear knob to drive the second adjustment rod to rotate, the second spring piece can be in contact with both the third latching tooth and the fourth latching tooth or only with the third latching tooth, thereby achieving on-off state adjustment, making the adjustment more accurate and effective.

In an embodiment of the present disclosure, the shape of the second limiting end is a curved shape corresponding to the shape of the third latching tooth and the fourth latching tooth. A second limiting block is provided in the base, and one end of the second spring piece away from the second limiting end abuts against the second limiting block. Therefore, the improved alignment of the second limiting end with the third latching tooth and the fourth latching tooth allows for flexible cooperation of the relative rotation between the second spring piece and the third latching tooth and the fourth latching tooth in both positive and negative directions, which ensures secure and stable positioning of the second spring piece within the base, preventing any potential loosening.

In an embodiment of the present disclosure, a glue-filled sealant is provided at the connection between the color-temperature adjustment knob and the luminous-flux gear knob and the protective cover. A sealant can be applied to seal and fill in order to create the glue-filled sealant, effectively closing the configuration gap for dustproof and waterproof protection and enhancing the longevity of the ground-insert lamp.

In an embodiment of the present disclosure, the ground-insert lamp includes a ground-insert member. A rotating seat is provided on one side of the lamp body close to the ground-insert member. The rotating seat is detachably connected to the ground-insert member and can rotate relative to the ground-insert member. By providing a rotating seat on the side of the lamp body close to the ground-insert member, the rotating seat and the ground-insert member are detachably connected such that the ground-insert lamp can be installed and disassembled more conveniently. The rotation of the rotating seat with respect to the ground-insert member permits adjustment of the lamp body to an optimal angle, thereby enhancing the lighting adjustment capabilities of the ground-insert lamp.

In an embodiment of the present disclosure, the lamp body also includes a focus adjustment knob and a lens. The focus adjustment knob is arranged on a side of the protective cover close to the ground-insert member. An opening is opened at one end of the protective cover away from the coaxial adjustment switch, and the opening accommodates the lens. The lens is provided at the opening of the protective cover away from the coaxial adjustment switch, and the focus adjustment knob is provided on the side of the protective cover close to the ground-insert member, the focal length of the lens can be adjusted by adjusting the focus adjustment knob, such that varying illumination angles can be realized to meet diverse lighting requirements of users.

In an embodiment of the present disclosure, the ground-insert lamp also includes an input wire and a hollow connector. The hollow connector is arranged between the lamp body and the ground-insert member and is connected to the lamp body and the ground-insert member. One end of the input wire is exposed out of the ground-insert member, and the other end thereof passes through the hollow connector and extends into the protective cover to be electrically connected to the wire corresponding to the light source assembly. The threading structure implemented in the aforementioned arrangement enhances the protection and durability of the input wire, thereby contributing to improved safety.

In an embodiment of the present disclosure, a sealing ring and a lens clamp are provided at one end of the lens close to the opening. By placing a sealing ring near the opening at one end of the lens, a waterproof and dustproof seal is established to prevent the ingress of water vapor or dust into the inner portion of the lens, thereby safeguarding the lighting efficiency of light transmitted through the lens. Additionally, the lens clamp serves to restrict the positioning of the lens, enhancing the structural stability of the positional arrangement thereof.

In an embodiment of the present disclosure, a sealing member is provided at the connection between the focus adjustment knob and the protective cover. By providing a sealing member at the connection of the focus adjustment knob and the protective cover, it is possible to create a waterproof and dustproof barrier, which ensures that a sealed environment is established within the protective cover, safeguarding it from external elements and consequently enhancing the longevity of the ground-insert lamp.

In an embodiment of the present disclosure, the ground-insert lamp includes an LED driver, which is disposed in the protective cover and electrically connected to the light source assembly. The light source assembly is disposed on a side close to a lens, and the LED driver is wrapped with an insulating layer. By providing an insulating layer around the LED driver, it is possible to effectively prevent the LED driver potential leakage and mitigate the risk of personal and property damage, further improving the safety of the ground-insert lamp during operation.

The above are only preferred embodiments of the present disclosure and are not intended to limit the present disclosure. Any modifications, equivalent substitutions and improvements made within the principles of the present disclosure should be included in the protection scope of the present disclosure.

The invention claimed is:

1. A lamp circuit, comprising a gear switch module, a control module, a drive module and a light source assembly that are electrically connected;
   the gear switch module comprising at least two switches;
   the drive module being provided with a power supply end, an input end and an output end; the power supply end thereof being connected to a power supply, the input end thereof being connected to an output end of the control module, and the output end thereof being connected to an input end of the light source assembly;
   the control module being configured to generate different control signals based on on-off states of the at least two switches, and the drive module being configured to adjust luminous flux of the light source assembly based on different control signals;
   the lamp circuit is electrically connected to a coaxial adjustment switch; the coaxial adjustment switch comprises a color-temperature adjustment switch and a luminous-flux adjustment switch that are coaxially arranged and electrically connected to the lamp circuit;
   the color-temperature adjustment switch comprises a color-temperature adjustment knob; the luminous-flux adjustment switch comprises a luminous-flux gear knob; the coaxial adjustment switch further comprises a first adjustment rod and a second adjustment rod arranged coaxially;
   the first adjustment rod comprises a first adjustment portion extending out of the protective cover, and the second adjustment rod comprises a second adjustment portion extending out of the protective cover: the color-temperature adjustment knob is sleeved on one of the first adjustment portion and the second adjustment portion, and the luminous-flux gear knob is sleeved on another of the first adjustment portion and the second adjustment portion.

2. The lamp circuit of claim 1, wherein the gear switch module comprises a first switch and a second switch connected in parallel.

3. The lamp circuit of claim 2, wherein when the first switch and the second switch are both turned to an OFF state, the control module is configured to generate a first control signal;
   or, when the first switch is turned to an ON state and the second switch is turned to an OFF state, the control module is configured to generate a second control signal;
   or, when the first switch is turned to an OFF state and the second switch is turned to an ON state, the control module is configured to generate a third control signal.

4. The lamp circuit of claim 1, further comprising a voltage stabilizing module, wherein an input end thereof is electrically connected to the power supply, and an output end thereof is electrically connected to an input end of the control module.

5. The lamp circuit of claim 1, wherein the power supply is a DC power supply obtained by rectifying an AC power through a rectifier diode.

6. The lamp circuit of claim 1, wherein the different control signals comprise at least one of a first control signal, a second control signal and a third control signal; the first control signal is a PWM signal with a duty cycle of 100%; the second control signal is a PWM signal with a duty cycle of 60%; and the third control signal is a PWM signal with a duty cycle of 30%.

7. The lamp circuit of claim 1, wherein the drive module comprises a PWM constant current chip electrically connected to the light source assembly.

8. A ground-insert lamp comprising a lamp body;
the lamp body comprising a protective cover, a coaxial adjustment switch arranged at one end of the protective cover and a lamp circuit arranged in the protective cover;
the lamp circuit comprising a gear switch module, a control module, a drive module and a light source assembly that are electrically connected;
the gear switch module comprising at least two switches;
the drive module being provided with a power supply end, an input end and an output end; the power supply end thereof is connected to a power supply, the input end thereof is connected to an output end of the control module, and the output end thereof is connected to an input end of the light source assembly;
the control module is configured to generate different control signals based on on-off states of the at least two switches, and the drive module is configured to adjust luminous flux of the light source assembly based on different control signals;
the coaxial adjustment switch is electrically connected to the lamp circuit; the coaxial adjustment switch comprises a color-temperature adjustment switch and a luminous-flux adjustment switch that are coaxially arranged and electrically connected to the lamp circuit;
the color-temperature adjustment switch comprises a color-temperature adjustment knob; the luminous-flux adjustment switch comprises a luminous-flux gear knob; the coaxial adjustment switch further comprises a first adjustment rod and a second adjustment rod arranged coaxially;
the first adjustment rod comprises a first adjustment portion extending out of the protective cover, and the second adjustment rod comprises a second adjustment portion extending out of the protective cover; the color-temperature adjustment knob is sleeved on one of the first adjustment portion and the second adjustment portion, and the luminous-flux gear knob is sleeved on another of the first adjustment portion and the second adjustment portion.

9. The ground-insert lamp of claim 8, wherein the first adjustment rod further comprises a first toggle portion, and the second adjustment rod further comprises a second toggle portion, both of which are arranged in the protective cover;
the first adjustment rod is inserted into the second adjustment rod, and the first adjustment portion and the first toggle portion are exposed from the second adjustment portion and the second toggle portion respectively;
the coaxial adjustment switch further comprises a base, and the base is provided with a partition that divides the base into a first space and a second space;
a first through hole is provided at a center of the partition, and a second through hole is provided on a side of the base close to the first adjustment portion;
the first toggle portion passes through the second through hole and the first through hole in sequence to extend into the first space, and the second toggle portion passes through the second through hole to extend into the second space;
a first spring piece and a second spring piece electrically connected to an outside circuit are respectively provided in the first space and the second space, and the first toggle portion and the second toggle portion are respectively connected to a first uniquely-shaped resistor and a second uniquely-shaped resistor;
the first spring piece abuts against the first toggle portion and/or the first uniquely-shaped resistor, and the second spring piece abuts against the second toggle portion and/or the second uniquely-shaped resistor.

10. The ground-insert lamp of claim 9, wherein a side surface of the second toggle portion axially parallel to the second adjustment rod is provided with a third latching tooth, a side surface of the second uniquely-shaped resistor axially parallel to the second adjustment rod is provided with at least two groups of fourth latching teeth, and a second groove is provided between the fourth latching teeth;
one end of the second spring piece abutting against the second toggle portion and the second uniquely-shaped resistor is the second limiting end, and when the second groove rotates to a position corresponding to the second limiting end, the second limiting end only abuts against the third latching tooth.

11. The ground-insert lamp of claim 10, wherein a shape of the second limiting end is a curved shape corresponding to that of the third latching tooth and the fourth latching tooth;
a second limiting block is provided in the base, and one end of the second spring piece away from the second limiting end abuts against the second limiting block.

12. The ground-insert lamp of claim 8, wherein a glue-filled sealant is provided at a position where the color-temperature adjustment knob and the luminous-flux gear knob are connected to the protective cover.

13. The ground-insert lamp of claim 8, wherein the ground-insert lamp comprises a ground-insert member, and a rotating seat is provided on one side of the lamp body close to the ground-insert member;
the rotating seat is detachably connected to the ground-insert member and can rotate relative to the ground-insert member.

14. The ground-insert lamp of claim 13, wherein the lamp body further comprises a focus adjustment knob and a lens; the focus adjustment knob is arranged on a side of the protective cover close to the ground-insert member, an opening is provided at one end of the protective cover away from the coaxial adjustment switch, and the opening accommodates the lens.

15. The ground-insert lamp of claim 13, wherein the ground-insert lamp further comprises an input wire and a hollow connector;
the hollow connector is arranged between and connected to the lamp body and the ground-insert member;
one end of the input wire is exposed out of the ground-insert member, and another end thereof passes through the hollow connector and extends into the protective cover to be electrically connected to a wire corresponding to the light source assembly.

16. The ground-insert lamp of claim 14, wherein a sealing ring and a lens clamp are provided at one end of the lens close to the opening.

17. The ground-insert lamp of claim 14, wherein a sealing member is provided at a position where the focus adjustment knob and the protective cover are connected.

18. The ground-insert lamp of claim 14, wherein the ground-insert lamp further comprises an LED driver disposed in the protective cover and electrically connected to the light source assembly;

the light source assembly is disposed on a side close to a lens, and the LED driver is wrapped with an insulating layer.

\* \* \* \* \*